United States Patent
Murree et al.

(10) Patent No.: US 10,131,216 B2
(45) Date of Patent: *Nov. 20, 2018

(54) WEATHERSTRIP ASSEMBLY FOR SEALING BETWEEN A FRAME AND A CLOSURE MEMBER AND A METHOD FOR PRODUCING THE SAME

(71) Applicant: Henniges Automotive Sealing Systems North America, Inc., Wilimington, DE (US)

(72) Inventors: Stephen J. Murree, Macomb, MI (US); Alessandro Libriani, Commerce Township, MI (US); Robert Krueger, Grosse Ile, MI (US)

(73) Assignee: HENNIGES AUTOMOTIVE SEALING SYSTEMS NORTH AMERICA INC., Wilmington, DE (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/276,056

(22) Filed: Sep. 26, 2016

(65) Prior Publication Data
US 2017/0080790 A1    Mar. 23, 2017

Related U.S. Application Data

(62) Division of application No. 14/642,398, filed on Mar. 9, 2015, now Pat. No. 9,475,374, which is a division
(Continued)

(51) Int. Cl.
*B60J 10/74* (2016.01)
*B29D 99/00* (2010.01)
(Continued)

(52) U.S. Cl.
CPC .......... *B60J 10/74* (2016.02); *B29D 99/0053* (2013.01); *B60J 10/16* (2016.02); *B60J 10/17* (2016.02);
(Continued)

(58) Field of Classification Search
CPC ... B60J 10/40; B60J 10/17; B60J 10/76; B60J 10/70; B60J 10/74; B60J 10/22
See application file for complete search history.

(56) References Cited

U.S. PATENT DOCUMENTS 1,582,506 A    4/1926   Bridgwood
2,021,972 A  * 11/1935  Vogt ........................ B60J 10/74
                                                            428/122
(Continued)

FOREIGN PATENT DOCUMENTS

| EP | 1 384 615 A1 | 1/2004 |
| JP | H10 244840 A | 9/1998 |
| JP | 2004 224302 A | 8/2004 |

OTHER PUBLICATIONS

Wikipedia, "Ultra-High_Molecular_Weight Polyethylene" downloaded from http://en.wikipedia.org/Ultra-high-molecular-weight_polyethylene.com on Oct. 15, 2013, 6 pages.
(Continued)

*Primary Examiner* — Marcus Menezes
(74) *Attorney, Agent, or Firm* — Howard & Howard Attorneys PLLC (57) ABSTRACT

A weatherstrip assembly for a vehicle. The assembly includes a body having a base and first and second legs which define a channel. The body includes an interior base surface, a first interior leg surface, and a second interior leg surface disposed within the channel. The assembly includes at least one sealing lip having an abutment surface and a wearstrip disposed along at least one of the interior base surface, the first and second interior leg surfaces, and the
(Continued)

abutment surface and formed of a thermoplastic polyethylene material. The wearstrip has a plurality of alternating wear sections and gaps that define a series of alternating semi-rigid and flexible sections, respectively, with each wear section having first and second surfaces. The first surface of one of the wear sections and the second surface of an adjacent wear section face each other to define the gap.

11 Claims, 7 Drawing Sheets

Related U.S. Application Data of application No. 14/059,849, filed on Oct. 22, 2013, now abandoned.

(60) Provisional application No. 61/716,953, filed on Oct. 22, 2012.

(51) Int. Cl.
*B60J 10/22* (2016.01)
*B60J 10/24* (2016.01)
*B60J 10/248* (2016.01)
*B60J 10/17* (2016.01)
*B60J 10/18* (2016.01)
*B60J 10/40* (2016.01)
*B60J 10/70* (2016.01)
*B60J 10/76* (2016.01)
*B60J 10/16* (2016.01)
*B60J 10/27* (2016.01)

(52) U.S. Cl.
CPC ............ *B60J 10/18* (2016.02); *B60J 10/22* (2016.02); *B60J 10/24* (2016.02); *B60J 10/248* (2016.02); *B60J 10/27* (2016.02); *B60J 10/40* (2016.02); *B60J 10/70* (2016.02); *B60J 10/76* (2016.02)

(56) References Cited

U.S. PATENT DOCUMENTS

| | | | | |
|---|---|---|---|---|
| 2,336,835 A * | 12/1943 | Balfe | ............... | B60J 10/17 15/159.1 |
| 2,504,510 A | 4/1950 | Ernest | | |
| 2,539,064 A | 1/1951 | Ernest | | |
| 2,594,717 A * | 4/1952 | Bailey | ............... | B60J 10/17 428/122 |
| 4,442,156 A * | 4/1984 | Yamaguchi | ............... | B60J 10/15 428/122 |
| 4,443,508 A | 4/1984 | Mehl | | |
| 4,511,526 A | 4/1985 | Yamaguchi | | |
| 4,913,976 A | 4/1990 | Brooks et al. | | |
| 4,923,759 A * | 5/1990 | Brooks | ............... | B32B 27/32 428/521 |
| 5,007,202 A | 4/1991 | Guillon | | |
| 5,013,379 A | 5/1991 | Brooks et al. | | |
| 5,027,556 A | 7/1991 | Ginster | | |
| 5,183,613 A | 2/1993 | Edwards | | |
| 5,247,764 A * | 9/1993 | Jeshurun | ............... | E06B 7/22 428/120 |
| 5,265,377 A * | 11/1993 | Iwasa | ............... | B29C 59/04 156/244.25 |
| 5,306,537 A * | 4/1994 | Gustafson | ............... | B05D 5/08 427/195 |
| 5,343,609 A | 9/1994 | McManus | | |
| 5,817,414 A | 10/1998 | Ando | | |
| 5,948,499 A * | 9/1999 | Tsukada | ............... | B05D 1/14 428/90 |
| 6,023,888 A | 2/2000 | Dover | | |
| 6,070,364 A | 6/2000 | Berry | | |
| 6,138,414 A * | 10/2000 | Ohmori | ............... | B60J 10/27 49/440 |
| 6,301,834 B1 | 10/2001 | Tyves | | |
| 6,389,754 B2 | 5/2002 | Nozaki | | |
| 6,406,785 B1 * | 6/2002 | Janes | ............... | B32B 5/16 428/327 |
| 6,499,256 B1 * | 12/2002 | Aritake | ............... | B60J 10/17 428/143 |
| 6,817,651 B2 | 11/2004 | Carvalho et al. | | |
| 7,763,197 B2 | 7/2010 | Ellis et al. | | |
| 9,475,374 B2 | 10/2016 | Murree et al. | | |
| 2005/0003158 A1 * | 1/2005 | Yamasa | ............... | B60J 10/16 428/143 |
| 2006/0064936 A1 | 3/2006 | Shiraiwa et al. | | |
| 2011/0109009 A1 | 5/2011 | Guellec | | |
| 2011/0239410 A1 * | 10/2011 | Goto | ............... | B60J 10/233 16/96 R |
| 2014/0109485 A1 | 4/2014 | Murree et al. | | |

OTHER PUBLICATIONS

Extended European Search Report for European Application No. 13 18 9794 completed Nov. 23, 2017; 8 pages.
English language abstract, and machine-assisted English language translation of Japanese Publication No. JP H10 244840 A extracted from www.espacenet.com on Feb. 5, 2018; 8 pages.
English language abstract, and machine-assisted English language translation of Japanese Publication No. JP 2004 224302 A extracted from www.espacenet.com on Mar. 5, 2018; 5 pages.

* cited by examiner

WEATHERSTRIP ASSEMBLY FOR SEALING BETWEEN A FRAME AND A CLOSURE MEMBER AND A METHOD FOR PRODUCING THE SAME

RELATED APPLICATION

The subject patent application is a divisional of co-pending U.S. patent application Ser. No. 14/642,398, filed on Mar. 9, 2015, which is a divisional of U.S. patent application Ser. No. 14/059,849, filed on Oct. 22, 2013, which claims priority to and all advantages of U.S. Provisional Patent Application No. 61/716,953, which was filed on Oct. 22, 2012, the disclosures of which are specifically incorporated by reference.

BACKGROUND OF THE INVENTION

1. Field of the Invention

The subject invention relates to a weatherstrip assembly for a vehicle.

2. Description of Related Art

Weatherstrip assemblies are used within many industries to provide a seal between multiple components capable of moving relative to one another. In one example, the weatherstrip assembly is used in a vehicle to seal between a door which defines a window opening, and a glass capable of sliding relative to the door to selectively close the window opening. The weatherstrip assembly typically includes a body portion defining a slot for receiving the glass and a seal member for abutting and sealing against the glass. The weatherstrip assembly typically includes a wear portion disposed in the channel and extending longitudinally along the weatherstrip assembly. The wear portion is typically comprised of a low-friction, rigid material, such as high durometer rubber or felt flocking. The wear portion extends continuously along the weatherstrip assembly.

The material from which the wear portion is formed is typically more rigid than the body portion and the seal member in order to extend the life of the wear portion as the glass repeatedly slides along the wear portion. The high rigidity makes the weatherstrip assembly more difficult to manipulate when mounting the weatherstrip assembly to the door. While the wear portion is low-friction, there is a continual desire in the industry to further reduce the friction between the wear portion and the glass. Therefore, there remains an opportunity to develop an improved weatherstrip assembly for a vehicle.

SUMMARY OF THE INVENTION AND ADVANTAGES

The subject invention provides for a weatherstrip assembly for sealing between a frame and a closure member of a vehicle. The weatherstrip assembly includes a body extending along an axis to first and second opposing ends. The body has a base, a first leg extending from the base, and a second leg extending from the base with the first and second legs spaced from and extending substantially parallel to each other, and the base and the legs defining a channel for receiving the closure member. The body further includes an exterior surface disposed outside of the channel, an interior base surface disposed within the channel along the base, a first interior leg surface disposed within the channel along the first leg, and a second interior leg surface disposed within the channel along the second leg. The weatherstrip assembly further includes at least one sealing lip having an abutment surface with the sealing lip extending from at least one of the first and second legs for selectively engaging the closure member. The weatherstrip assembly further includes a wearstrip disposed along and extending from at least one of the interior base surface, the first interior leg surface, the second interior leg surface, and the abutment surface. The wearstrip is formed of a thermoplastic polyethylene material for reducing friction as the closure member moves relative to the weatherstrip assembly. The wearstrip has a plurality of alternating wear sections and gaps that define a series of alternating semi-rigid and flexible sections, respectively, with each wear section having first and second surfaces and an engagement surface extending between the first and second surfaces. The first surface of one of the wear sections and the second surface of an adjacent wear section face each other to define the gap with the gaps promoting flexing at the flexible sections for facilitating mounting of the weatherstrip assembly to the frame.

The subject invention further provides for a method of producing the weatherstrip assembly as described above. The weatherstrip assembly includes the body extending along the axis to the first and second opposing ends. The body has the base, the first leg extending from the base, and the second leg extending from the base with the base and the legs defining the channel. The weatherstrip assembly further includes the exterior surface disposed outside of the channel, the interior base surface disposed within the channel along the base, the first interior leg surface disposed within the channel along the first leg, and the second interior leg surface disposed within the channel along the second leg. The weatherstrip assembly further includes at least one sealing lip having the abutment surface. Furthermore, the weatherstrip assembly includes the wearstrip formed of the thermoplastic polyethylene material. The method includes the steps of extruding the body between the first and second ends and simultaneously extruding the at least one sealing lip extending from at least one of the first and second legs longitudinally along the body between the first and second ends. The method further includes the steps of extruding the wearstrip along at least one of the interior base surface, the first interior leg surface, the second interior leg surface, and the abutment surface between the first and second surfaces and interrupting the extrusion of the wearstrip while continuing the extrusion of the body and the at least one sealing lip to form the plurality of alternating wear sections and gaps that define the series of alternating semi-rigid and flexible sections.

Accordingly, the flexing of the weatherstrip assembly facilitates mounting of the weatherstrip assembly to the frame. Specifically, the flexing of the weatherstrip assembly allows the weatherstrip assembly to contour along and mount to non-linear configurations of the frame and allows an installer to manipulate the weatherstrip assembly in any way which increases the ease in which the weatherstrip assembly is mounted to the frame. Additionally, the gaps between the wear sections reduce contact between the wearstrip and the closure member which reduces the friction between the closure member and the wearstrip allowing the closure member to slide more easily within the weatherstrip assembly. Furthermore, the alternating wear sections and gaps require less material to produce the wearstrip which reduces the cost to manufacture the weatherstrip assembly.

BRIEF DESCRIPTION OF THE DRAWINGS

Advantages of the subject invention will be readily appreciated as the same becomes better understood by reference to the following detailed description when considered in connection with the accompanying drawings.

DETAILED DESCRIPTION OF THE INVENTION

Figures 1, 2, 3:
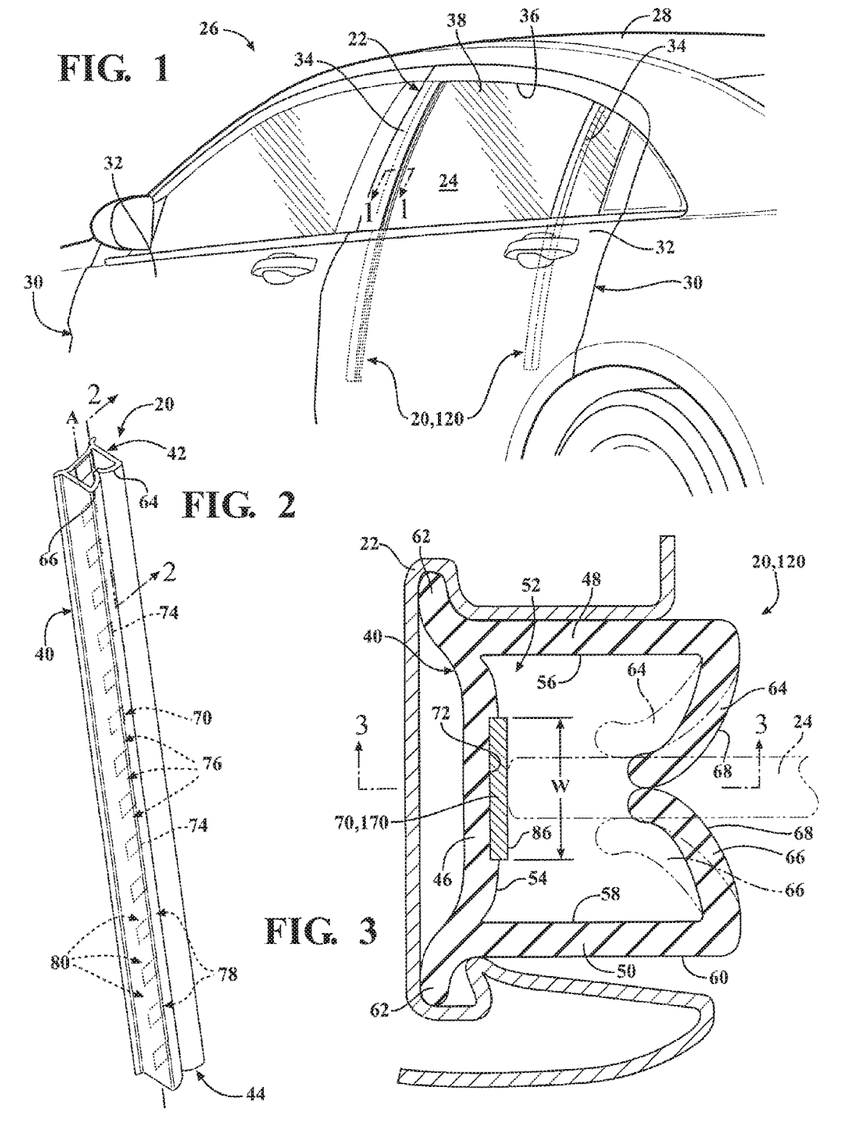
FIG. 1 is a perspective view of a vehicle having a weatherstrip assembly.
FIG. 2 is a perspective view of the weatherstrip assembly.
FIG. 3 is a lateral cross-sectional view of the weatherstrip assembly, taken along 1-1 shown in FIG. 1, including a body having a base and including a wearstrip disposed on the base.

Referring to the Figures, wherein like numerals indicate like or corresponding parts throughout the several views, a weatherstrip assembly 20 for sealing between a frame 22 and a closure member 24 of a vehicle 26 is generally shown in FIG. 1. The vehicle 26 is typically a passenger car or a truck. However, it is to be appreciated that the vehicle 26 may be any configuration for providing transportation. The vehicle 26 may include a vehicle body 28 and a plurality of doors 30 pivotally coupled to the vehicle body 28. However, it is to be appreciated that the doors 30 may be coupled to and movable relative to the vehicle body 28 in any configuration.

The frame 22 may be further defined as the door 30. Specifically, as shown in FIG. 1, the door 30 has a body portion 32 and a window frame 34 with the window frame 34 extending outwardly and substantially planar to the body portion 32 and with the body portion 32 and the window frame 34 defining a window 36. Alternatively, the frame 22 may be further defined as the body portion 32 of the door 30 and the vehicle body 28, with the window 36 partially defined by the body portion 32 of the door 30 and partially defined by the vehicle body 28. Such a configuration is typically referred to as a "frameless door window." It is to be appreciated that the frame 22 may be configured in any way in which at least one of the door 30 and the vehicle body 28 at least partially defines the window 36.

The closure member 24 may be further defined as a glass pane 38. The glass pane 38 is movable relative to the door 30 between a first position and a second position. More specifically, the glass pane 38 moves planar to the door 30. In the first position, the glass pane 38 is disposed entirely outside of the window 36. Said differently, the glass pane 38 is disposed entirely within the body portion 32 of the door 30. In the second position, the glass pane 38 is disposed at least partially within the window 36. In the second position, the glass pane 38 may be disposed within the window 36 such that the glass pane 38 entirely closes the window 36. It is to be appreciated that the second position may refer to any position of the glass pane 38 in which the glass pane 38 is disposed within the window 36. It is to be further appreciated that the closure member 24 may be any component of the vehicle 26 movable relative to at least one of the door 30 and the vehicle body 28, including, but not limited to, the door 30, a hood, or a trunk lid.

As shown in FIG. 1, the weatherstrip assembly 20 may extend from within the body portion 32 of the door 30 into the window 36. The weatherstrip assembly 20 may be fully disposed within the body portion 32 of the door 30. Alternatively, the weatherstrip assembly 20 may be fully disposed within the window 36. It is to be appreciated that the weatherstrip assembly 20 may be disposed in any configuration relative to the window 36 and the body portion 32 of the door 30.

Figure 6:
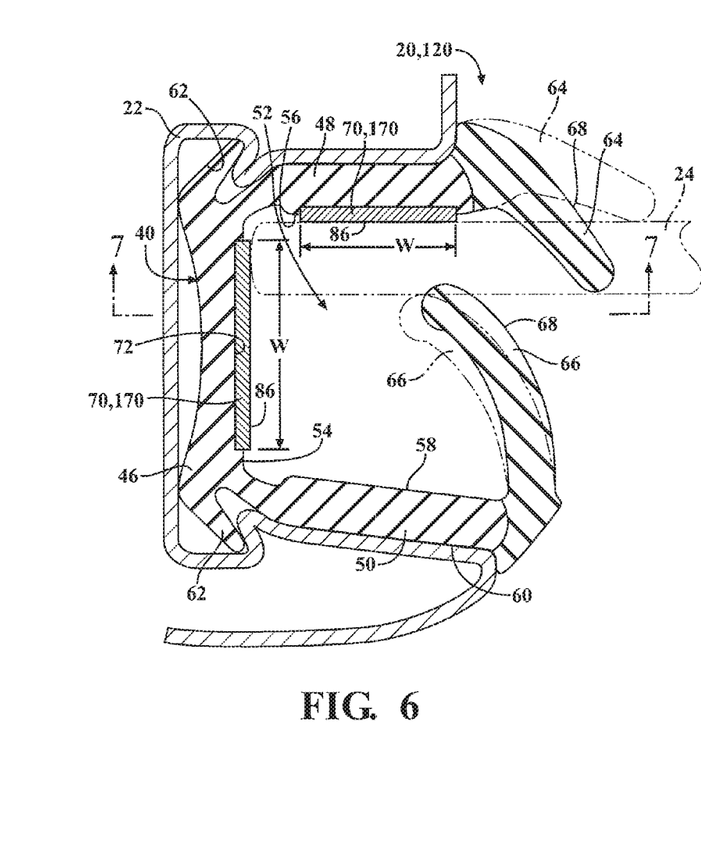
FIG. 6 is a lateral cross-sectional view of a weatherstrip assembly having a body which has a base and first and second legs, the weatherstrip assembly including wearstrips disposed on the base and the first leg.

As shown in FIG. 2, the weatherstrip assembly 20 includes a body 40 extending along an axis A to first and second opposing ends 42, 44. The axis A generally has a linear configuration; however, as will be described below, the axis A may have a non-linear configuration as a result of flexing of the weatherstrip assembly 20. As shown in FIGS. 3 and 6, the body 40 has a base 46, a first leg 48 extending from the base 46, and a second leg 50 extending from the base 46 with the first and second legs 48, 50 spaced from and extending substantially parallel to each other. Each of the first and second legs 48, 50 extend to a distal end. The base 46 and the legs 48, 50 define a channel 52 for receiving the closure member 24. The channel 52 extends along the axis A between the first and second ends 42, 44. The base 46 and the first and second legs 48, 50 have a substantially "U" configuration, as shown in FIG. 3. It is to be appreciated that the base 46 and the first and second legs 48, 50 may have any suitable configuration for defining the channel 52.

The body 40 includes an interior base surface 54 disposed within the channel 52 along the base 46, a first interior leg surface 56 disposed within the channel 52 along the first leg 48, and a second interior leg surface 58 disposed within the channel 52 along the second leg 50. The body 40 further includes an exterior surface 60 disposed outside of the channel 52. The exterior surface 60 opposes each of the interior base surface 54, the first interior leg surface 56, and the second interior leg surface 58 along the base 46 and the first and second legs 48, 50, respectively.

The weatherstrip assembly 20 may further include at least one tab 62 extending from the body 40 away from the channel 52 for coupling the weatherstrip to the frame 22. As shown in FIGS. 3 and 6, the at least one tab 62 is further defined as a pair of tabs 62 with one of the pair of tabs 62 extending from the base 46 adjacent the first leg 48 and another one of the pair of tabs 62 extending from the base 46 adjacent the second leg 50. The tabs 62 engage the frame 22 to couple the weatherstrip assembly 20 to the frame 22.

The weatherstrip assembly 20 includes at least one sealing lip 64, 66 having an abutment surface 68 with the sealing lip 64, 66 extending from at least one of the first and second legs 48, 50 for selectively engaging the closure member 24. More specifically, the at least one sealing lip 64, 66 may be further defined as a first sealing lip 64 and a second sealing lip 66 with the first sealing lip 64 extending from the distal end of the first leg 48 and the second sealing lip 66 extending from the distal end of the second leg 50. It is to be appreciated that the at least one sealing lip 64, 66 may be any number of sealing lips 64, 66. The abutment surface 68 extends around each of the first and second sealing lips 64, 66 and selectively engages the closure member 24.

As shown in FIGS. 3 and 6, the first and second sealing lips 64, 66 extend toward each other. The extension of the first and second sealing lips 64, 66 toward each other facilitates engagement and sealing of each of the first and second sealing lips 64, 66 against the closure member 24 at the abutment surface 68. The first and second sealing lips 64, 66 bias toward each other to further seal and guide the closure member 24 within the channel 52. As shown in FIG. 3, the first and second sealing lips 64, 66 may be configured to extend into the channel 52 toward the base 46 of the body 40. Such a configuration may be used within the body portion 32 of the door 30, as shown in FIG. 1. Alternatively, at least one of the first and second sealing lips 64, 66 may extend outwardly away from the channel 52. As shown in FIG. 6, the first sealing lip 64 extends outwardly away from the channel 52 and the second sealing lip 66 extends inwardly into the channel 52. The outward extension of the first sealing lip 64 promotes a smooth transition between the first sealing lip 64 and the closure member 24, creating an aesthetically-pleasing appearance. Such a configuration may be used within the window 36 which is visible to an observer, as shown in FIG. 1. It is to be appreciated that the sealing lips 64, 66 may have any configuration and may be disposed anywhere on the frame 22.

Each of the body 40 and the at least one sealing lip 64, 66 may be comprised of a rubber material for sealing against the closure member 24. More specifically, the rubber material of each of the body 40 and the at least one sealing lip 64, 66 may be further defined as an ethylene propylene diene monomer (EPDM) rubber for sealing against the closure member 24. Furthermore, the tabs 62 may be comprised of a rubber material or may be further defined as an EPDM rubber. It is to be appreciated that the body 40, the at least one sealing lip 64, 66, and the tabs 62 may be formed of any semi-rigid elastomeric material including Santoprene® thermoplastic elastomer (TPE) produced by ExxonMobil Chemical Company of Houston, Tex., and the like. It is also to be appreciated that each of the body 40, the at least one sealing lip 64, 66, and the tabs 62 may be formed of a cellular or sponge EPDM having a lower density and rigidity or any combination of materials. In addition, it is to be appreciated that the body 40, the at least one sealing lip 64, 66, and the tabs 62 may be any suitable hardness or hardnesses, rigidity or rigidities, density or densities, etc. It is also to be appreciated that different combinations of materials may be disposed in varying locations within the body 40, the at least one sealing lip 64, 66, and the tabs 62. It is to further be appreciated that any suitable polymeric material(s) may be used for the body 40, the at least one sealing lip 64, 66, and the tabs 62.

Figure 4:
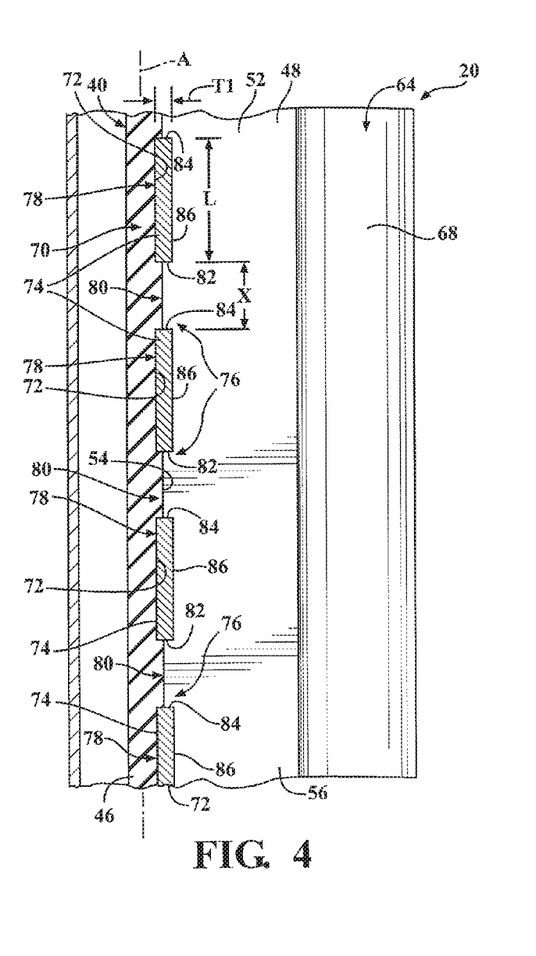
FIG. 4 is a longitudinal cross-sectional view of the weatherstrip assembly shown in FIG. 3 taken along 3-3, with the weatherstrip assembly including the wearstrip having a plurality of alternating wear sections and gaps with the gaps partially defined by the body.

As shown in FIGS. 3 and 4, the weatherstrip assembly 20 includes a wearstrip 70 disposed along and extending from at least one of the interior base surface 54, the first interior leg surface 56, the second interior leg surface 58, and the abutment surface 68 with the wearstrip 70 formed of a thermoplastic polyethylene material for reducing friction as the closure member 24 moves relative to the weatherstrip assembly 20. The thermoplastic polyethylene material is a low friction, semi-rigid elastomeric material. The thermoplastic polyethylene material of the wearstrip 70 may be further defined as an ultra-high-molecular-weight polyethylene material (UHMWPE) for reducing friction as the closure member 24 moves along the wearstrip 70. Furthermore, the wearstrip 70 may be an engineered thermoplastic material with UHMWPE particulates disposed therein. The wearstrip 70 may also be formed of a plurality of fibers within a matrix or coupled to an adhesive. In addition, the wearstrip 70 may be formed of extrusion grade polypropylene. It is to be appreciated that the wearstrip 70 may any suitable hardness or hardnesses, rigidity or rigidities, density or densities, etc. It is to further be appreciated that any suitable polymeric material(s) may be utilized for the wearstrip 70.

Figure 9:
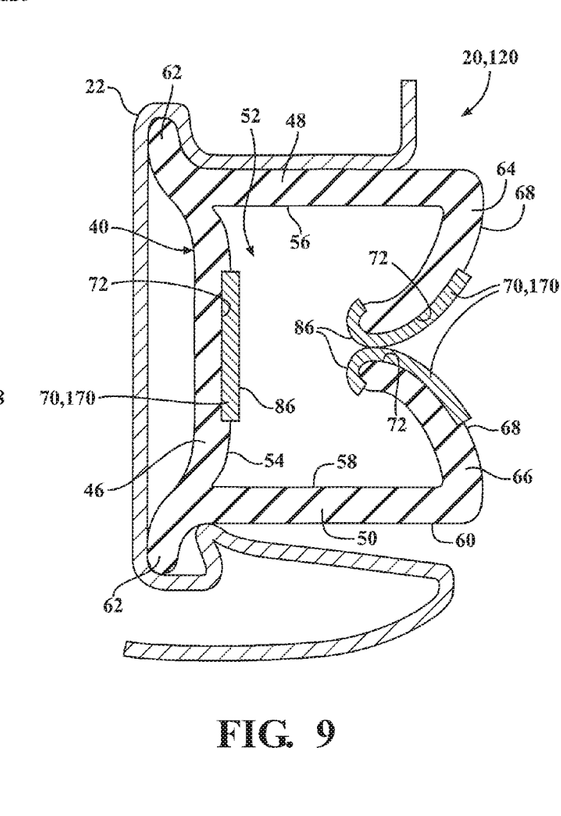
FIG. 9 is a lateral cross-sectional view of a weatherstrip assembly having a body which has a base and a pair of sealing lips, the weatherstrip assembly including wearstrips disposed on the base and the sealing lips.
Figure 10:
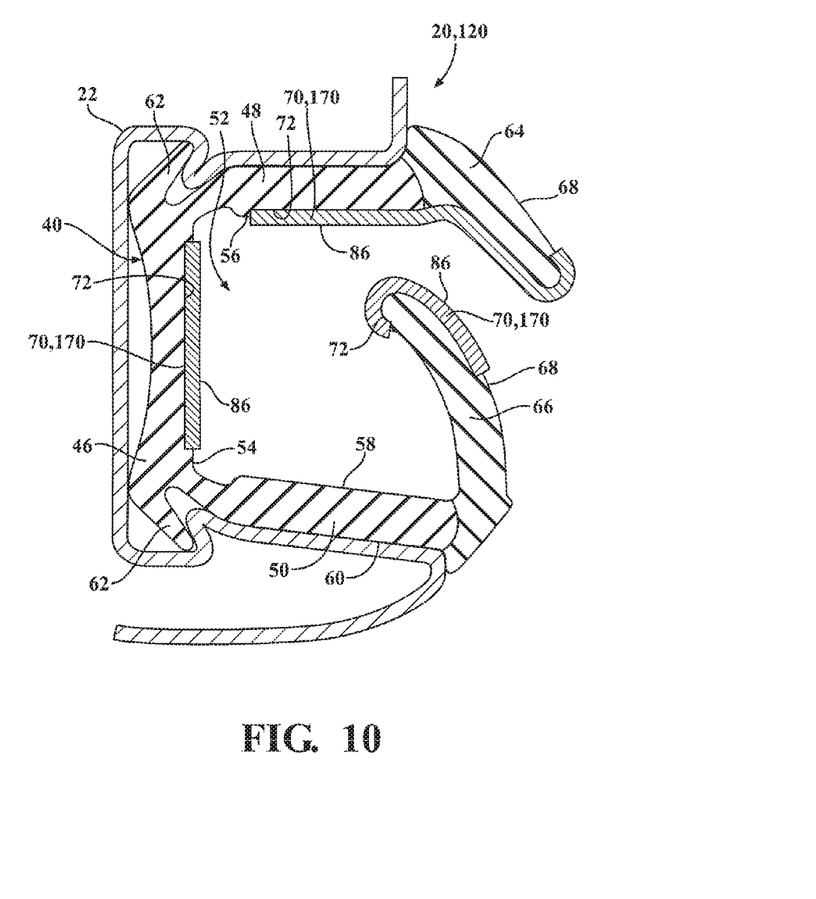
FIG. 10 is a lateral cross-sectional view of a weatherstrip assembly having a body which has a base, first and second legs, and a pair of sealing lips, the weatherstrip assembly including wearstrips disposed on the base, the first leg, and the sealing lips.

As shown in FIG. 3, the wearstrip 70 may be disposed along the interior base surface 54 and extend toward the first and second ends 42, 44. In such a configuration, the wearstrip 70 extends between the first and second legs 48, 50. The wearstrip 70 may also be disposed along at least one of the first and second interior leg surfaces 56, 58 and extend toward the first and second ends 42, 44, as shown in FIG. 6. In such a configuration, the wearstrip 70 extends between the base 46 and the adjacent one of the first and second sealing lips 64, 66. The wearstrip 70 may also be disposed along the abutment surface 68 of at least one of the first and second sealing lips 64, 66 and extend toward the first and second ends 42, 44, as shown in FIG. 9. In such a configuration, the wearstrip 70 may be disposed anywhere along abutment surface 68. The wearstrip 70 may face inwardly toward the channel 52, outwardly away from the channel 52, or both inwardly and outwardly. The wearstrip 70 may also extend continuously across multiple surfaces. As a non-limiting example, the wearstrip 70 extends along each of the first interior leg surface 56 and the abutment surface 68 as shown in FIG. 10. It is to be appreciated that the wearstrip 70 may extend along any of the interior base surface 54, the first interior leg surface 56, the second interior leg surface 58, and the abutment surface 68 in any configuration. For the sake of simplicity, further discussions of the wearstrip 70 below refer to a singular wearstrip 70 disposed along one of the interior base surface 54, the first interior leg surface 56, the second interior leg surface 58, and the abutment surface 68. Said differently, although multiple wearstrips 70 may be disposed along the body 40 and the at least one lip of the weatherstrip assembly 20, it is to be appreciated that further description of the wearstrip 70 below is referring to a singular wearstrip 70 and the configuration of the singular wearstrip 70.

As shown in FIGS. 3, 6, 9, and 10, the at least one of the interior base surface 54, the first interior leg surface 56, the second interior leg surface 58, and the abutment surface 68 may define a depression 72. The wearstrip 70 is at least partially disposed within the depression 72 to facilitate adhesion between the wearstrip 70 and the at least one of the interior base surface 54, the first and second interior leg surfaces 56, 58, and the abutment surface 68. Said differently, the depression 72 increases surface area contacting between the wearstrip 70 and the at least one of the interior base surface 54, the first and second interior leg surfaces 56, 58, and the abutment surface 68. The increase in surface area improves the adhesion between the wearstrip 70 and the at least one of the interior base surface 54, the first and second interior leg surfaces 56, 58, and the abutment surface 68.

Figure 7:
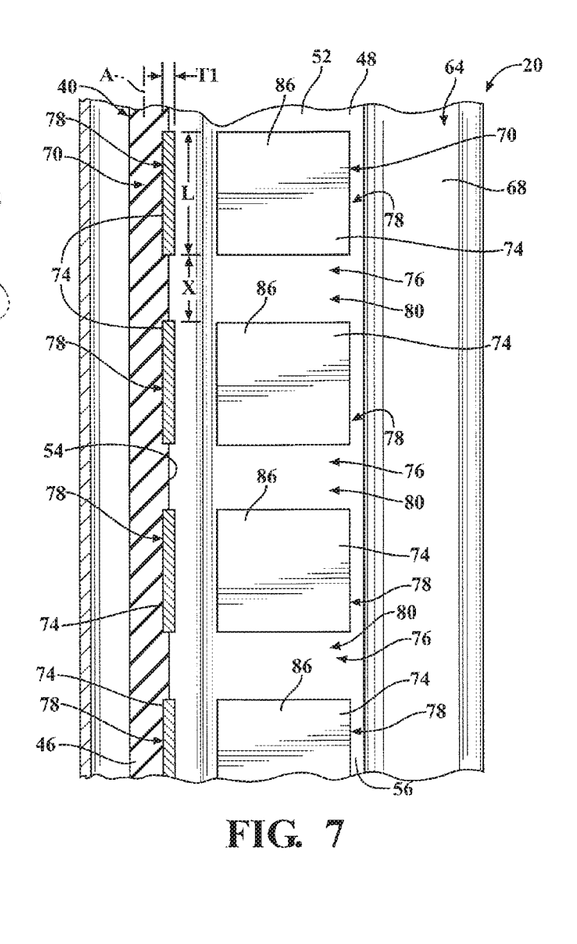
FIG. 7 is a longitudinal cross-sectional view of the weatherstrip assembly shown in FIG. 6, taken along 7-7, the weatherstrip assembly including the wearstrips each having a plurality of alternating wear sections and gaps with the gaps partially defined by the body.

As shown in FIGS. 4 and 7, the wearstrip 70 has a plurality of alternating wear sections 74 and gaps 76 that define a series of alternating semi-rigid and flexible sections 78, 80, respectively. Said differently, each wear section 74 corresponds to the semi-rigid sections 78 and each gap 76 corresponds to the flexible sections 80. Each wear section 74 has first and second surfaces 82, 84 and an engagement surface 86 extending between the first and second surfaces 82, 84. The first surface 82 of one of the wear sections 74 and the second surface 84 of an adjacent wear section 74 face each other to define the gap 76. Each of the wear sections 74 are linearly disposed with the gaps 76 disposed between the wear sections 74.

Each of the gaps 76 may be further defined by the body 40. Said differently, the at least one of the interior base surface 54, first interior leg surface 56, the second interior leg surface 58, and the abutment surface 68 extends between the first surface 82 of one of the wear sections 74 and the second surface 84 of an adjacent wear section 74 which face one another.

The engagement surface 86 of the wear sections 74 may have a height T1 from the at least one of the interior base surface 54, the first interior leg surface 56, the second interior leg surface 58, and the abutment surface 68 with the height T1 of the engagement surface 86 at least about 10 microns. More specifically, the height T1 of the engagement surface 86 is measured from within the depression 72. The height T1 is great enough that the engagement surface 86 is disposed above and spaced from the at least one of the interior base surface 54, the first interior leg surface 56, the second interior leg surface 58, and the abutment surface 68. The engagement surfaces 86 of the wear sections 74 of the wearstrip 70 are substantially planar. Said differently, the heights T1 of the engagement surfaces 86 of each of the wear sections 74 are substantially equal. The substantially equal heights T1 of the wear sections 74 promote sliding of the closure member 24 along the engagement surfaces 86, as will be described in greater detail below. Although a range of heights T1 have been provided, it is to be appreciated that the height T1 may be less than 10 microns. It is to be further appreciated that the height T1 of the engagement surface 86 may be any suitable height T1.

As shown in FIGS. 6 and 7, the wearstrip 70 may have a width W transverse to the axis A. The wear sections 74 extend across the width W of the wearstrip 70. Said differently, the wear sections 74 define the width W of the wearstrip 70. Furthermore, the height T1 of the engagement surface 86 of the wear sections 74 extends across the entire width W of the wearstrip 70.

As shown in FIGS. 4 and 7, each of the wear sections 74 may have a length L with each of the lengths L substantially equidistant. More specifically, the length L of each of the wear sections 74 is measured along the axis A. Furthermore, each of the gaps 76 have a spacing dimension X measured from the first surface 82 of one of the wear sections 74 to the second surface 84 of the adjacent wear section 74 which faces the opposing first surface 82. The spacing dimensions X of the gaps 76 are substantially equidistant. The equidistant configuration of the wear sections 74 and the gaps 76 creates a repeating and congruent wear section 74 and adjacent gap 76 along the axis A.

As shown in FIG. 7, each of the wear sections 74 may have a rectangular configuration. More specifically, the first and second surfaces 82, 84 may be disposed substantially perpendicular to the axis A. However, it is to be appreciated that the wear sections 74 may have any suitable shape or configuration.

The body 40 and the at least one sealing lip 64, 66 may have a first coefficient of friction and the wear sections 74 may have a second coefficient of friction. The second coefficient of friction is less than the first coefficient of friction for facilitating movement of the closure member 24 along the wearstrip 70. More specifically, as described above, the body 40 and the at least one sealing lip 64, 66 may be formed of the EPDM material or any of the other suitable materials described above. The material of the body 40 and the at least one sealing lip 64, 66 has a high coefficient of friction which may inhibit movement of the closure member 24 along the body 40 and the at least one sealing lip 64, 66. On the other hand, as described above, the wearstrip 70 may be formed of the thermoplastic polyethylene material or any of the other suitable materials described above. The material of the wearstrip 70 has a coefficient of friction lower than the body 40 and the at least one sealing lip 64, 66 which promotes movement of the closure member 24 along the wearstrip 70. Further, the height T1 of the wear sections 74 space the closure member 24 from the body 40 and the at least one sealing lip 64, 66, which have the higher coefficient of friction than the wearstrip 70.

As the closure member 24 moves between the first position and the second position, the closure member 24 moves along the engagement surface 86 of the wearstrip 70. Specifically, as illustrated between FIGS. 14, 15, and 16, as the closure member 24 moves between the first and second positions the closure member 24 moves along at least one of the wear sections 74 toward an adjacent gap 76. The closure member 24 remains at least partially disposed on the engagement surface 86 of the at least one wear section 74 and moves across the gap 76. Since the height T1 of the wear sections 74 are substantially equal, the closure member 24 moves across the gap 76 and slides along the next successive wear section 74. The closure member 24 repetitiously moves along the wear sections 74 of the wearstrip 70. The gaps 76 between the wear sections 74 reduce the contact between the wearstrip 70 and the closure member 24. The reduction in contact between the closure member 24 and the wearstrip 70 reduces the friction between the closure member 24 and the wearstrip 70, allowing the closure member 24 to slide more easily within the weatherstrip assembly 20 between the first and second positions.

The alternating wear sections 74 and gaps 76 further reduce the cost to manufacture the weatherstrip assembly 20. The alternating gaps 76 and wear sections 74 require less material to produce the wearstrip 70. The reduction in material required for the wearstrip 70 reduces the overall cost of the weatherstrip assembly 20.

Additionally, the gaps 76 promote flexing at the flexible sections 80 for facilitating mounting of the weatherstrip assembly 20 to the frame 22. As described above, the alternating wear sections 74 and gaps 76 define the series of alternating semi-rigid and flexible sections 80, respectively. More specifically, the body 40 and the at least one sealing lip 64, 66 may be formed of the EPDM material or any of the other suitable materials, as described above, and the wearstrip 70 may be formed of the thermoplastic polyethylene material or any of the other suitable materials, as described above. The material of the wearstrip 70 has a rigidity greater than a rigidity of the body 40 and the at least one wearstrip 70. The semi-rigid sections 78 defined by the wear sections 74 reduces the flexibility of the weatherstrip assembly 20 at the wear sections 74. The absence of the wearstrip 70 at the gaps 76 reduces the rigidity of the weatherstrip assembly 20 at the gaps 76 and creates localized areas of increased flexibility along the weatherstrip assembly 20. Said differently, only the rigidity of the body 40 and the at least one sealing lip 64, 66 affect the flexibility of the weatherstrip assembly 20 at the gaps 76.

Figure 11:
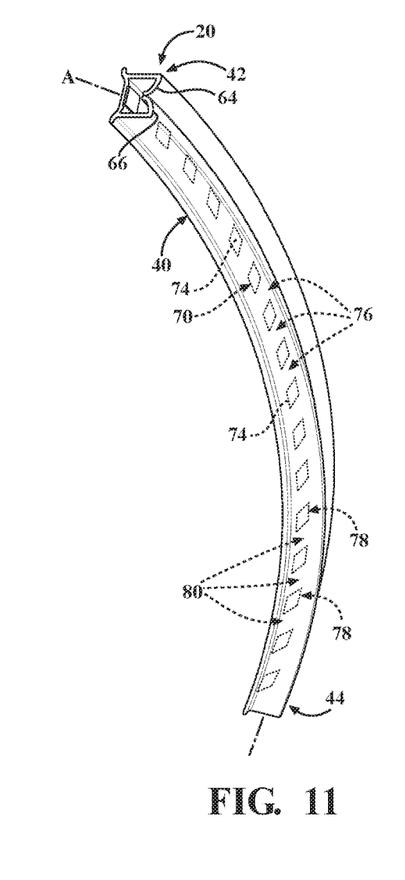
FIG. 11 is perspective view of a weatherstrip assembly including a body having a base with the weatherstrip assembly laterally flexed relative to the base.
Figures 12, 13:
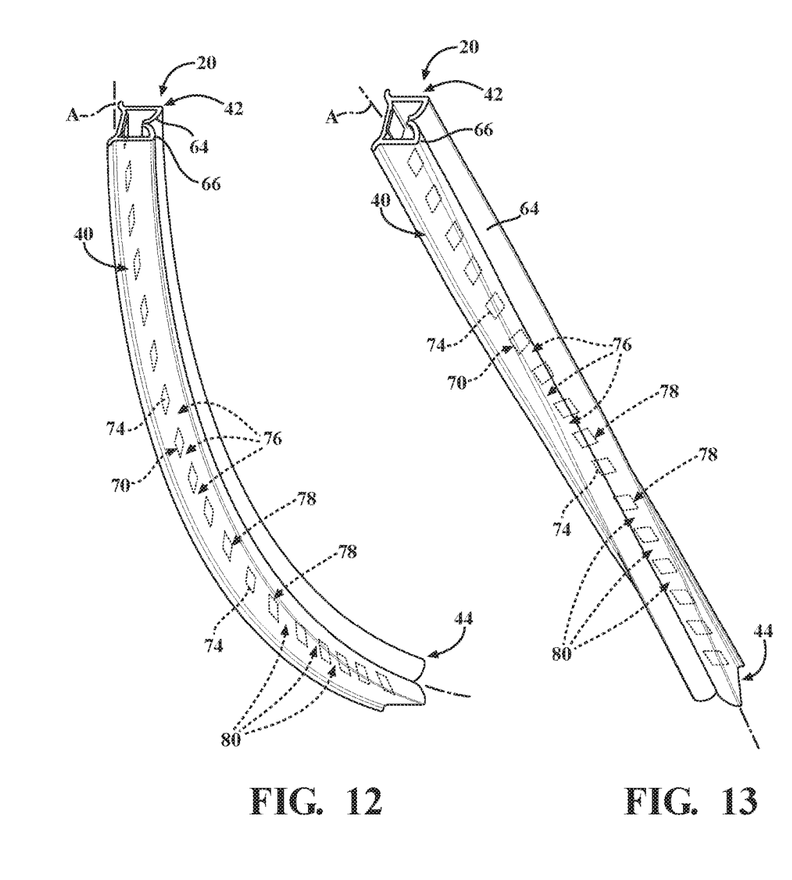
FIG. 12 is perspective view of the weatherstrip assembly including the body having first and second legs with the weatherstrip assembly laterally flexed relative to the first and second legs.
FIG. 13 is perspective view of the weatherstrip assembly rotationally flexed about an axis.

As shown in FIGS. 11, 12, and 13, the flexible sections 80 defined by the gaps 76 allow for lateral flexing of the weatherstrip assembly 20. Specifically, as shown in FIG. 11, the weatherstrip assembly 20 may flex laterally about the first and second legs 48, 50. As shown in FIG. 12, the weatherstrip assembly 20 may flex laterally about the base 46. Furthermore, as shown in FIG. 13, the flexible sections 80 defined by the gaps 76 allow for rotational flexing of the weatherstrip assembly 20 about the axis A. It is to be appreciated that the weatherstrip assembly 20 may flex in any combination of the above described directions. Furthermore, it is to be appreciated that the weatherstrip assembly 20 may flex in any direction which is facilitated by the flexible sections 80 defined by the gaps 76.

The flexing of the weatherstrip assembly 20 facilitates mounting of the weatherstrip assembly 20 to the frame 22. Specifically, the flexing of the weatherstrip assembly 20 allows the weatherstrip assembly 20 to contour along and mount to non-linear configurations of the frame 22. Further, flexing of the weatherstrip assembly 20 allows an installer to manipulate the weatherstrip assembly 20 in any way which increases the ease in which the weatherstrip assembly 20 is mounted to the frame 22.

The weatherstrip assembly 20 may be formed by a co-extrusion process in which two or more dissimilar materials are simultaneously extruded to form a final component. As described above, the body 40, the at least one lip, the tabs 62, and wearstrip 70 may be formed of dissimilar materials. The body 40, the at least one lip, and the tabs 62 are formed through continual flow of material during the co-extrusion process. Since the wear sections 74 of the wearstrip 70 are spaced from one another at the gaps 76, the wearstrip 70 is formed using a non-continuous co-extrusion. Said differently, the flow of material to form the wearstrip 70 is periodically stopped to form the gaps 76 between the wear sections 74. It is to be appreciated that the weatherstrip assembly 20 may be formed by any suitable process.

The subject invention also provides a method of producing the weatherstrip assembly 20 as described above and shown in FIGS. 3, 4, 6, and 7. For example, the weatherstrip assembly 20 includes the body 40 extending along the axis A to the first and second opposing ends 42, 44. The body 40 has the base 46, the first leg 48 extending from the base 46, and the second leg 50 extending from the base 46 with the base 46 and the legs 48, 50 defining the channel 52. The weatherstrip assembly 20 further includes the exterior surface 60 disposed outside of the channel 52, the interior base surface 54 disposed within the channel 52 along the base 46, the first interior leg surface 56 disposed within the channel 52 along the first leg 48, and the second interior leg surface 58 disposed within the channel 52 along the second leg 50. The weatherstrip assembly 20 further includes the at least one sealing lip 64, 66 having the abutment surface 68. Furthermore, the weatherstrip assembly 20 includes the wearstrip 70 formed of the thermoplastic polyethylene material.

The method includes the steps of extruding the body 40 between the first and second ends 42, 44 and simultaneously extruding the at least one sealing lip 64, 66 extending from at least one of the first and second legs 48, 50 longitudinally along the body 40 between the first and second ends 42, 44.

The method further includes the steps of extruding the wearstrip 70 along the at least one of the interior base surface 54, the first interior leg surface 56, the second interior leg surface 58, and the abutment surface 68 between the first and second surfaces 82, 84 and interrupting the extrusion of the wearstrip 70 while continuing the extrusion of the body 40 and the at least one sealing lip 64, 66 to form the plurality of alternating wear sections 74 and gaps 76 that define the series of alternating semi-rigid and flexible sections 78, 80. The step of interrupting the extrusion of the wearstrip 70 may be further defined as temporarily stopping the extrusion of the wearstrip 70 such that the gaps 76 are defined by the body 40.

Figure 5:
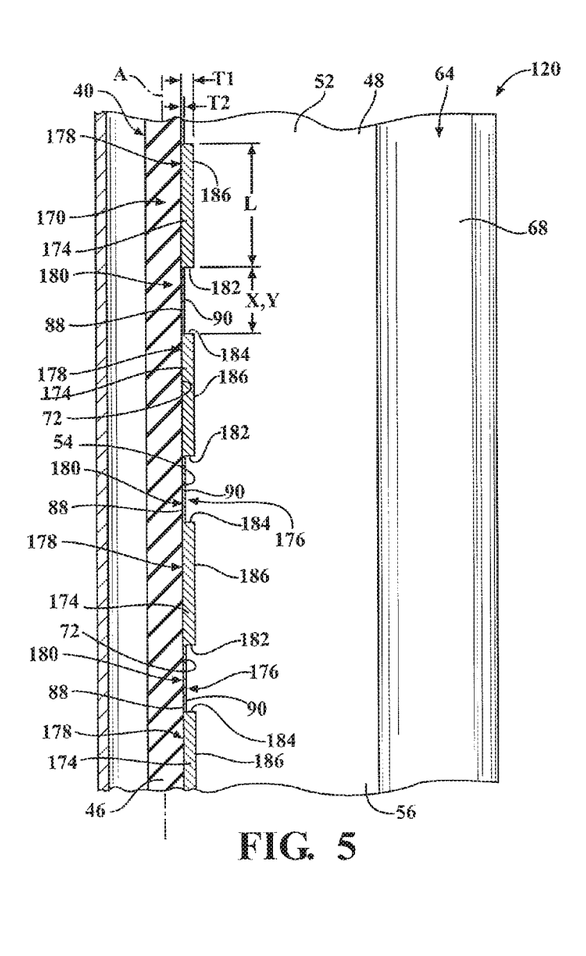
FIG. 5 is a longitudinal cross-sectional view of the weatherstrip assembly shown in FIG. 3 taken along 3-3, with the weatherstrip assembly including a wearstrip having a plurality of alternating wear sections and gaps and having a transition section disposed in each of the gaps.
Figure 8:
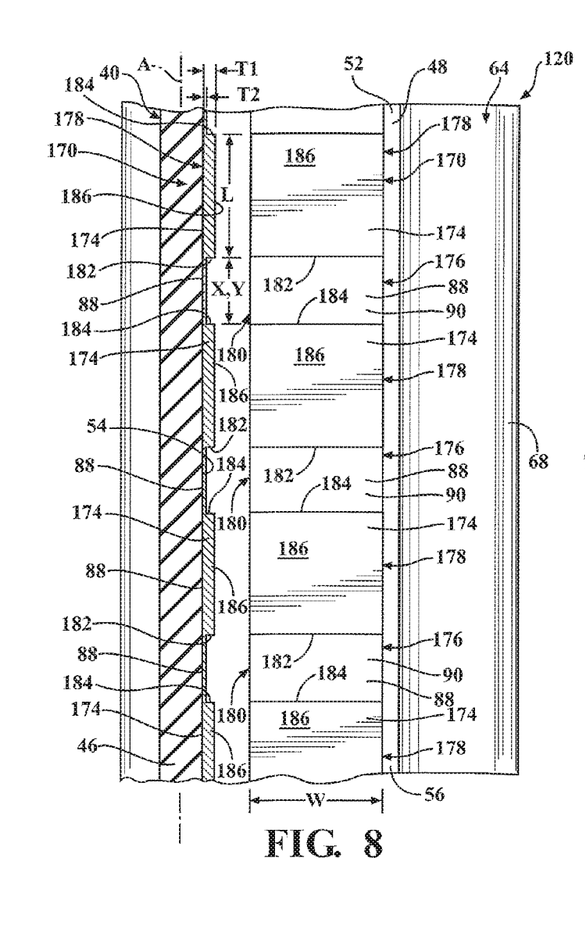
FIG. 8 is a longitudinal cross-sectional view of the weatherstrip assembly shown in FIG. 6, taken along 7-7, the weatherstrip assembly including the wearstrips each having a plurality of alternating wear sections and gaps and having a transition section disposed in each of the gaps.

Referring to FIGS. 5 and 8, another embodiment of the weatherstrip assembly 120 for sealing between the frame 22 and the closure member 24 of the vehicle 26, wherein like reference numerals increased by 100 indicate corresponding parts throughout the several views, is generally shown. Identical components discussed in the preceding embodiment of the assembly 20 have the same reference numerals in this embodiment and additional components of this embodiment have new reference numerals.

The primary distinction between the preceding embodiment of the assembly 20 and this embodiment of the assembly 120 is that the weatherstrip assembly 120 has a wearstrip 170 which may include a transition section 88.

As shown in FIG. 2, the weatherstrip assembly 120 includes the body 40 extending along the axis A to the first and second opposing ends 42, 44. The axis A generally has a linear configuration; however, as will be described below, the axis A may have a non-linear configuration as a result of flexing of the weatherstrip assembly 120. As shown in FIGS. 3 and 6, the body 40 has the base 46, the first leg 48 extending from the base 46, and the second leg 50 extending from the base 46 with the first and second legs 48, 50 spaced from and extending substantially parallel to each other. Each of the first and second legs 48, 50 extend to the distal end. The base 46 and the legs 48, 50 define the channel 52 for receiving the closure member 24. The channel 52 extends along the axis A between the first and second ends 42, 44. The base 46 and the first and second legs 48, 50 have the substantially "U" configuration, as shown in FIG. 3. It is to be appreciated that the base 46 and the first and second legs 48, 50 may have any suitable configuration for defining the channel 52.

The body 40 includes the interior base surface 54 disposed within the channel 52 along the base 46, the first interior leg surface 56 disposed within the channel 52 along the first leg 48, and the second interior leg surface 58 disposed within the channel 52 along the second leg 50. The body 40 further includes the exterior surface 60 disposed outside of the channel 52. The exterior surface 60 opposes each of the interior base surface 54, the first interior leg surface 56, and the second interior leg surface 58 along the base 46 and the first and second legs 48, 50, respectively.

The weatherstrip assembly 120 may further include the at least one tab 62 extending from the body 40 away from the channel 52 for coupling the weatherstrip to the frame 22. As shown in FIGS. 3 and 6, the at least one tab 62 is further defined as the pair of tabs 62 with one of the pair of tabs 62 extending from the base 46 adjacent the first leg 48 and another one of the pair of tabs 62 extending from the base 46 adjacent the second leg 50. The tabs 62 engage the frame 22 to couple the weatherstrip assembly 120 to the frame 22.

The weatherstrip assembly 120 includes the at least one sealing lip 64, 66 having the abutment surface 68 with the sealing lip 64, 66 extending from at least one of the first and second legs 48, 50 for selectively engaging the closure member 24. More specifically, the at least one sealing lip 64, 66 may be further defined as the first sealing lip 64 and the second sealing lip 66 with the first sealing lip 64 extending from the distal end of the first leg 48 and the second sealing lip 66 extending from the distal end of the second leg 50. It is to be appreciated that the at least one sealing lip 64, 66 may be any number of sealing lips 64, 66. The abutment surface 68 extends around each of the first and second sealing lips 64, 66 and selectively engages the closure member 24.

As shown in FIGS. 3 and 6, the first and second sealing lips 64, 66 extend toward each other. The extension of the first and second sealing lips 64, 66 toward each other facilitates engagement and sealing of each of the first and second sealing lips 64, 66 against the closure member 24 at the abutment surface 68. The first and second sealing lips 64, 66 bias toward each other to further seal and guide the closure member 24 within the channel 52. As shown in FIG. 3, the first and second sealing lips 64, 66 may be configured to extend into the channel 52 toward the base 46 of the body 40. Such a configuration may be used within the body portion 32 of the door 30, as shown in FIG. 1. Alternatively, at least one of the first and second sealing lips 64, 66 may extend outwardly away from the channel 52. As shown in FIG. 6, the first sealing lip 64 extends outwardly away from the channel 52 and the second sealing lip 66 extends inwardly into the channel 52. The outward extension of the first sealing lip 64 promotes a smooth transition between the first sealing lip 64 and the closure member 24, creating an aesthetically-pleasing appearance. Such a configuration may be used within the window 36 which is visible to an observer, as shown in FIG. 1. It is to be appreciated that the sealing lips 64, 66 may have any configuration and may be disposed anywhere on the frame 22.

Each of the body 40 and the at least one sealing lip 64, 66 may be comprised of the rubber material for sealing against the closure member 24. More specifically, the rubber material of each of the body 40 and the at least one sealing lip 64, 66 may be further defined as the EPDM rubber for sealing against the closure member 24. Furthermore, the tabs 62 may be comprised of the rubber material or may be further defined as the EPDM rubber. It is to be appreciated that the body 40, the at least one sealing lip 64, 66, and the tabs 62 may be formed of any semi-rigid elastomeric material including the Santoprene® thermoplastic elastomer (TPE) produced by ExxonMobil Chemical Company of Houston, Tex., and the like. It is also to be appreciated that each of the body 40, the at least one sealing lip 64, 66, and the tabs 62 may be formed of the cellular or sponge EPDM having a lower density and rigidity or any combination of materials. In addition, it is to be appreciated that the body 40, the at least one sealing lip 64, 66, and the tabs 62 may be any suitable hardness or hardnesses, rigidity or rigidities, density or densities, etc. It is also to be appreciated that different combinations of materials may be disposed in varying locations within the body 40, the at least one sealing lip 64, 66, and the tabs 62. It is to further be appreciated that any suitable polymeric material(s) may be used for the body 40, the at least one sealing lip 64, 66, and the tabs 62.

As shown in FIGS. 3 and 5, the weatherstrip assembly 120 includes the wearstrip 170 disposed along and extending from at least one of the interior base surface 54, the first interior leg surface 56, the second interior leg surface 58, and the abutment surface 68 with the wearstrip 170 formed of a thermoplastic polyethylene material for reducing friction as the closure member 24 moves relative to the weatherstrip assembly 120. The thermoplastic polyethylene material is a low friction, semi-rigid elastomeric material. The thermoplastic polyethylene material of the wearstrip 170 may be further defined as an ultra-high-molecular-weight polyethylene material (UHMWPE) for reducing friction as the closure member 24 moves along the wearstrip 170. Furthermore, the wearstrip 170 may be an engineered thermoplastic material with UHMWPE particulates disposed therein. The wearstrip 170 may also be formed of a plurality of fibers within a matrix or coupled to an adhesive. In addition, the wearstrip 70 may be formed of extrusion grade polypropylene. It is to be appreciated that the wearstrip 170 may any suitable hardness or hardnesses, rigidity or rigidities, density or densities, etc. It is to further be appreciated that any suitable polymeric material(s) can be utilized for the wearstrip 170.

As shown in FIG. 3, the wearstrip 170 may be disposed along the interior base surface 54 and extend toward the first and second ends 42, 44. In such a configuration, the wearstrip 170 extends between the first and second legs 48, 50. The wearstrip 170 may also be disposed along at least one of the first and second interior leg surfaces 56, 58 and extend toward the first and second ends 42, 44, as shown in FIG. 6. In such a configuration, the wearstrip 170 extends between the base 46 and the adjacent one of the first and second sealing lips 64, 66. The wearstrip 170 may also be disposed along the abutment surface 68 of at least one of the first and second sealing lips 64, 66 and extend toward the first and second ends 42, 44, as shown in FIG. 9. In such a configuration, the wearstrip 170 may be disposed anywhere along abutment surface 68. The wearstrip 170 may face inwardly toward the channel 52, outwardly away from the channel 52, or both inwardly and outwardly. The wearstrip 170 may also extend continuously across multiple surfaces. As a non-limiting example, the wearstrip 170 extends along each of the first interior leg surface 56 and the abutment surface 68 as shown in FIG. 10. It is to be appreciated that the wearstrip 170 may extend along any of the interior base surface 54, the first interior leg surface 56, the second interior leg surface 58, and the abutment surface 68 in any configuration. For the sake of simplicity, further discussions of the wearstrip 170 below refer to a singular wearstrip 170 disposed along one of the interior base surface 54, the first interior leg surface 56, the second interior leg surface 58, and the abutment surface 68. Said differently, although multiple wearstrips 170 may be disposed along the body 40 and the at least one lip 64, 66 of the weatherstrip assembly 120, it is to be appreciated that further description of the wearstrip 170 below is referring to a singular wearstrip 170 and the configuration of the singular wearstrip 170.

As shown in FIGS. 3, 6, 9, and 10, the at least one of the interior base surface 54, the first interior leg surface 56, the second interior leg surface 58, and the abutment surface 68 may define the depression 72. The wearstrip 170 is at least partially disposed within the depression 72 to facilitate adhesion between the wearstrip 170 and the at least one of the interior base surface 54, the first and second interior leg surfaces 56, 58, and the abutment surface 68. Said differently, the depression 72 increases surface area contacting between the wearstrip 170 and the at least one of the interior base surface 54, the first and second interior leg surfaces 56, 58, and the abutment surface 68. The increase in surface area improves the adhesion between the wearstrip 170 and the at least one of the interior base surface 54, the first and second interior leg surfaces 56, 58, and the abutment surface 68.

As shown in FIGS. 5 and 8, the wearstrip 170 has a plurality of alternating wear sections 174 and gaps 176 that define a series of alternating semi-rigid and flexible sections 178, 180, respectively. Said differently, each wear section 174 corresponds to the semi-rigid sections 178 and each gap 176 corresponds to the flexible sections 180. Each wear section 174 has first and second surfaces 182, 184 and an engagement surface 186 extending between the first and second surfaces 182, 184. The first surface 182 of one of the wear sections 174 and the second surface 184 of an adjacent wear section 174 face each other to define the gap 176. Each of the wear sections 174 are linearly disposed with the gaps 176 disposed between the wear sections 174.

Each of the gaps 176 may be further defined by the body 40. Said differently, the at least one of the interior base surface 54, first interior leg surface 56, the second interior leg surface 58, and the abutment surface 68 extends between the first surface 182 of one of the wear sections 174 and the second surface 184 of an adjacent wear section 174 which face one another.

As described above, the wearstrip 170 may include the transition section 88 disposed in each of the gaps 176 between the wear sections 174. The transition section 88 extends from the at least one of the interior base surface 54, the first interior leg surface 56, the second interior leg surface 58, and the abutment surface 68.

As shown in FIGS. 5 and 8, the engagement surface 186 of the wear sections 174 may have a first height T1 from the at least one of the interior base surface 54, the first interior leg surface 56, the second interior leg surface 58, and the abutment surface 68. The transition section 88 may have a transition surface 90 having a second height T2 from the at least one of the interior base surface 54, the first interior leg surface 56, the second interior leg surface 58, and the abutment surface 68. The first height T1 of the engagement surface 186 is greater than the second height T2 of the transition surface 90 for reducing contact and friction between the closure member 24 and the wearstrip 170, as will be described in greater detail below.

The first height T1 of the engagement surface 186 of the wear section 174 is at least about 10 microns. The second height T2 of the transition surface 90 of the transition section 88 is less than the first height T1. More specifically, the first height T1 of the engagement surface 186 and the second height T2 of the transition surface 90 are measured from within the depression 72. The first height T1 is great enough that the engagement surface 186 is disposed above and spaced from the transition surface 90. The engagement surfaces 186 of the wear sections 174 of the wearstrip 170 are substantially planar. Said differently, the first heights T1 of the engagement surfaces 186 of each of the wear sections 174 are substantially equal. Likewise, the transition surfaces 90 of the transition sections 88 are substantially planar. Said differently, the second heights T2 of the transition surfaces 90 of each of the transition sections 88 are substantially equal. The substantially equal heights of the wear sections 174 promote sliding of the closure member 24 along the engagement surfaces 186, as will be described in greater detail below. Although a range of first heights T1 have been provided, it is to be appreciated that the first height T1 may be less than 10 microns. It is to be further appreciated that the first height T1 of the engagement surface 186 may be any suitable height. It is to be further appreciated that the second height T2 of the engagement surface 186 may be any suitable height as long as the second height T2 of the transition surface 90 is less than the first height T1 of the engagement surface 186.

As shown in FIGS. 6 and 8, the wearstrip 170 may have a width W transverse to the axis A. The wear sections 174 extend across the width W of the wearstrip 170. Said differently, the wear sections 174 define the width W of the wearstrip 170. Furthermore, the first height T1 of the engagement surface 186 of the wear sections 174 and the second height T2 of the transition surface 90 of the transition sections 88 extends across the entire width W of the wearstrip 170.

As shown in FIGS. 5 and 8, each of the wear sections 174 may have a length L with each of the lengths L substantially equidistant. More specifically, the length L of each of the wear sections 174 is measured along the axis A. Furthermore, each of the gaps 176 have a spacing dimension X measured from the first surface 182 of one of the wear sections 174 to the second surface 184 of the adjacent wear section 174 which faces the opposing first surface 182. The transition sections 88 have a length dimension Y equal to the spacing dimension of the gaps 176. Each of the spacing dimensions X of the gaps 176 and the length dimensions Y of the transition sections 88 are substantially equidistant. The equidistant configuration of the wear sections 174 and the overlapping gaps 176 and transition sections 88 creates a repeating and congruent wear section 174 and adjacent overlapping gap 176 and transition section 88 along the axis A.

As shown in FIG. 8, each of the wear sections 174 may have a rectangular configuration. More specifically, the first and second surfaces 182, 184 may be disposed substantially perpendicular to the axis A. However, it is to be appreciated that the wear sections 174 may have any suitable shape or configuration. Similarly, each of the transition sections 88 may have a rectangular configuration. However, it is to be appreciated that the transitions sections may have any suitable shape or configuration.

The body 40 and the at least one sealing lip 64, 66 may have a first coefficient of friction and the wear sections 174 may have a second coefficient of friction. The second coefficient of friction is less than the first coefficient of friction for facilitating movement of the closure member 24 along the wearstrip 170. More specifically, as described above, the body 40 and the at least one sealing lip 64, 66 may be formed of the EPDM material or any of the other suitable materials described above. The material of the body 40 and the at least one sealing lip 64, 66 has a high coefficient of friction which may inhibit movement of the closure member 24 along the body 40 and the at least one sealing lip 64, 66. On the other hand, as described above, the wearstrip 170 may be formed of the thermoplastic polyethylene material or any of the other suitable materials described above. The material of the wearstrip 170 has a coefficient of friction lower than the body 40 and the at least one sealing lip 64, 66 which promotes movement of the closure member 24 along the wearstrip 170. Further, the first height T1 of the wear sections 174 space the closure member 24 from the body 40 and the at least one sealing lip 64, 66, which have the higher coefficient of friction than the wearstrip 170.

Figure 14:
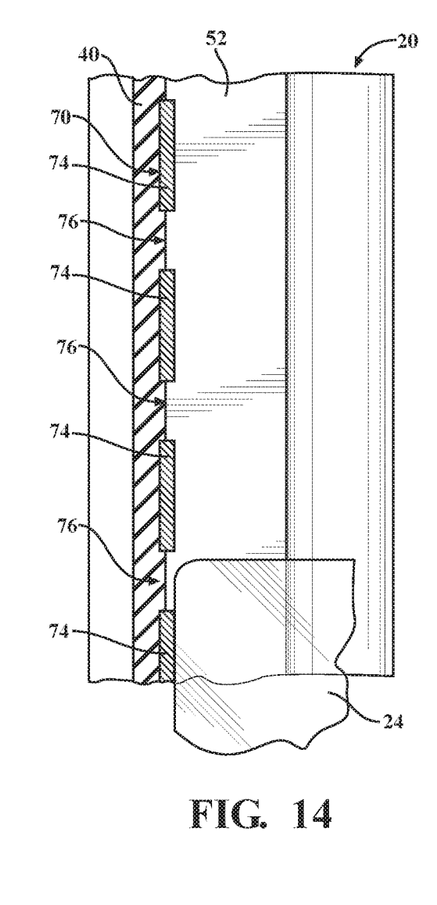
FIG. 14 is a longitudinal cross-sectional view of a weatherstrip assembly taken along 2-2 shown in FIG. 2, including a wearstrip having a plurality of wear sections, and a closure member, with the closure member disposed along one of the wear sections.
Figure 15:
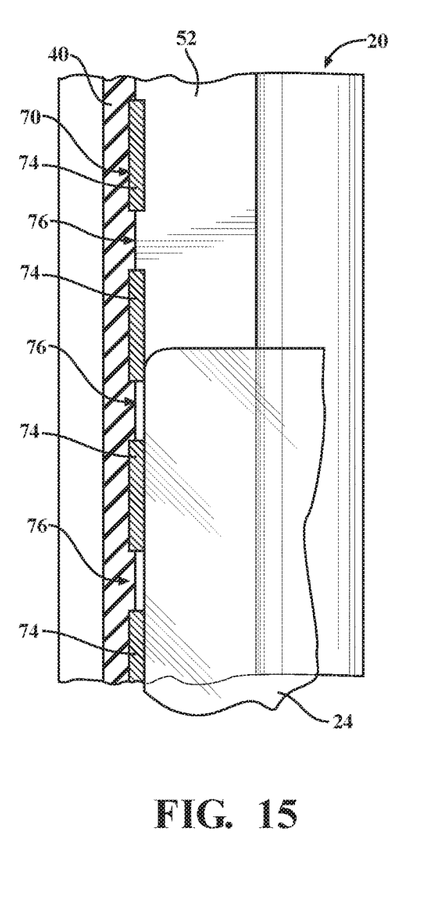
FIG. 15 is a longitudinal cross-sectional view of the weatherstrip assembly taken along 2-2 shown in FIG. 2, including the wearstrip having the plurality of wear sections, and the closure member, with the closure member disposed along three of the wear sections.
Figure 16:
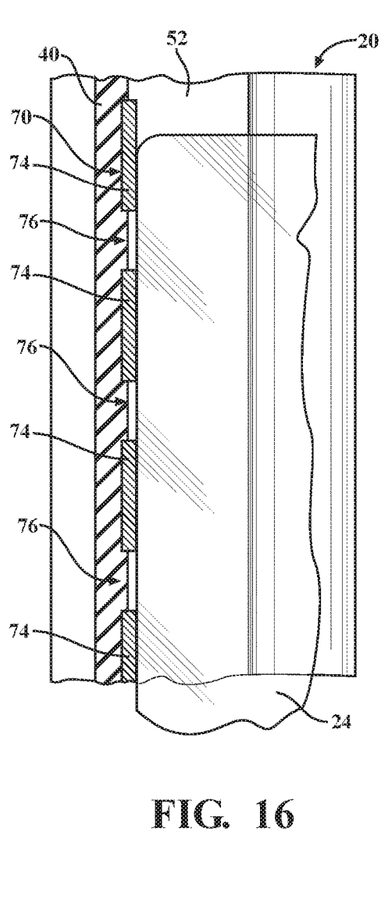
FIG. 16 is a longitudinal cross-sectional view of the weatherstrip assembly taken along 2-2 shown in FIG. 2, including the wearstrip having the plurality of wear sections, and the closure member, with the closure member disposed along four of the wear sections.

As the closure member 24 moves between the first position and the second position, the closure member 24 moves along the engagement surface 186 of the wearstrip 170. Specifically, as generally illustrated by FIGS. 14, 15, and 16 of the preceding embodiment, as the closure member 24 moves between the first and second positions, the closure member 24 moves along at least one of the wear sections 174 toward an adjacent gap 176 and transition section 88. The closure member 24 remains at least partially disposed on the engagement surface 186 of the at least one wear section 174 and moves across the gap 176. Since the first height T1 of the wear sections 174 are substantially equal, the closure member 24 moves across the gap 176 and over the lower second height T2 of the transition sections 88 and slides along the next successive wear section 174. The closure member 24 repetitiously moves along the wear sections 174 of the wearstrip 170. The gaps 176 and the transition sections 88 having the lower height between the wear sections 174 reduce the contact between the wearstrip 170 and the closure member 24. The reduction in contact between the closure member 24 and the wearstrip 170 reduces the friction between the closure member 24 and the wearstrip 170, allowing the closure member 24 to slide more easily within the weatherstrip assembly 120 between the first and second positions.

The alternating first and second heights T1, T2 of the wear sections 174 and transition sections 88, respectively, as shown in FIGS. 5 and 8, further reduce the cost to manufacture the weatherstrip assembly 120. The lower second heights T2 of the transition sections 88 require less material than the higher first heights T1 of the wear sections 174. The reduction in material required for the wearstrip 170 reduces the overall cost of the weatherstrip assembly 120.

Additionally, the gaps 176 promote flexing at the flexible sections 180 for facilitating mounting of the weatherstrip assembly 120 to the frame 22. More specifically, the transition sections 88 having the lower second height T2 disposed in the gaps 176 promote flexing at the flexible sections 180 for facilitating mounting of the weatherstrip assembly 120 to the frame 22 As described above, the alternating wear sections 174 and gaps 176 define the series of alternating semi-rigid and flexible sections 180, respectively. More specifically, the body 40 and the at least one sealing lip 64, 66 may be formed of the EPDM material or any of the other suitable materials, as described above, and the wearstrip 170 may be formed of the thermoplastic polyethylene material or any of the other suitable materials, as described above. The material of the wearstrip 170 has a rigidity greater than a rigidity of the body 40 and the at least one wearstrip 170. The semi-rigid sections 178 defined by the wear sections 174 reduces the flexibility of the weatherstrip assembly 120 at the wear sections 174. The transition sections 88 within the gaps 176 have the second height T2 which is lower than the first height T1 of the wear sections 174. The lower second height T2 reduces the rigidity of the transition sections 88 which reduces the rigidity of the weatherstrip assembly 120 at the gaps 176, creating localized areas of increased flexibility along the weatherstrip assembly 120.

As generally illustrated by FIGS. 11, 12, and 13 of the preceding embodiment, the flexible sections 180 defined by the gaps 176 allow for lateral flexing of the weatherstrip assembly 120. Specifically, as shown in FIG. 11, the weatherstrip assembly 120 may flex laterally about the first and second legs 48, 50. As shown in FIG. 12, the weatherstrip assembly 120 may flex laterally about the base 46. Furthermore, as shown in FIG. 13, the flexible sections 180 defined by the gaps 176 allow for rotational flexing of the weatherstrip assembly 120 about the axis A. It is to be appreciated that the weatherstrip assembly 120 may flex in any combination of the above described directions. Furthermore, it is to be appreciated that the weatherstrip assembly 120 may flex in any direction which is facilitated by the flexible sections 180 defined by the gaps 176.

The flexing of the weatherstrip assembly 120 facilitates mounting of the weatherstrip assembly 120 to the frame 22. Specifically, the flexing of the weatherstrip assembly 120 allows the weatherstrip assembly 120 to contour along and mount to non-linear configurations of the frame 22. Further, flexing of the weatherstrip assembly 120 allows an installer to manipulate the weatherstrip assembly 120 in any way which increases the ease in which the weatherstrip assembly 120 is mounted to the frame 22.

The weatherstrip assembly 120 may be formed by a co-extrusion process in which two or more dissimilar materials are simultaneously extruded to form a final component. As described above, the body 40, the at least one lip 64, 66, the tabs 62, and wearstrip 170 may be formed of dissimilar materials. The body 40, the at least one lip 64, 66, and the tabs 62 are formed through continual flow of material during the co-extrusion process. Since the wear sections 174 of the wearstrip 170 are spaced from one another at the gaps 176, the wearstrip 170 is formed using a non-continuous co-extrusion; however, instead of completely stopping the flow of material to form the gaps 176 between the wear sections 174, the flow of material is significantly reduced to alternately form the second height T2 of the transition surface 90 of the transition section 88 which is lower than the first height T1 of the engagement surface 186 of the wear sections 174. It is to be appreciated that the weatherstrip assembly 120 can be formed by any suitable process.

The subject invention also provides a method of producing the weatherstrip assembly 120 as described above and shown in FIGS. 3, 5, 6, and 8. For example, the weatherstrip assembly 120 includes the body 40 extending along the axis A to the first and second opposing ends 42, 44. The body 40 has the base 46, the first leg 48 extending from the base 46, and the second leg 50 extending from the base 46 with the base 46 and the legs 48, 50 defining the channel 52. The weatherstrip assembly 120 further includes the exterior surface 60 disposed outside of the channel 52, the interior base surface 54 disposed within the channel 52 along the base 46, the first interior leg surface 56 disposed within the channel 52 along the first leg 48, and the second interior leg surface 58 disposed within the channel 52 along the second leg 50. The weatherstrip assembly 120 further includes the at least one sealing lip 64, 66 having the abutment surface

68. Furthermore, the weatherstrip assembly 120 includes the wearstrip 170 formed of the thermoplastic polyethylene material.

The method includes the steps of extruding the body 40 between the first and second ends 42, 44 and simultaneously extruding the at least one sealing lip 64, 66 extending from at least one of the first and second legs 48, 50 longitudinally along the body 40 between the first and second ends 42, 44.

The method further includes the steps of extruding the wearstrip 170 along the at least one of the interior base surface 54, the first interior leg surface 56, the second interior leg surface 58, and the abutment surface 68 between the first and second surfaces 182, 184 and interrupting the extrusion of the wearstrip 170 while continuing the extrusion of the body 40 and the at least one sealing lip 64, 66 to form the plurality of alternating wear sections 174 and gaps 176 that define the series of alternating semi-rigid and flexible sections 178, 180.

The wearstrip 170 further includes the transition section 88 disposed in each of the gaps 176 as described above. Therefore, the step of interrupting the extrusion of the wearstrip 170 is further defined as simultaneously extruding the transition section 88 in the gaps 176 during the interruption. Furthermore, as described above, each wear section 174 has the engagement surface 186 having the first height T1 from the at least one of the interior base surface 54, the first interior leg surface 56, the second interior leg surface 58, and the abutment surface 68, and the transition section 88 has the transition surface 90 having the second height T2 from the at least one of the interior base surface 54, the first interior leg surface 56, the second interior leg surface 58, and the abutment surface 68 with the first height T1 greater than the second height T2. Therefore, the step of simultaneously extruding the transition section 88 in the gaps 176 during the interruption is further defined as simultaneously extruding the transition section 88 in the gaps 176 during the interruption at the second height T2.

The invention has been described in an illustrative manner, and it is to be understood that the terminology which has been used is intended to be in the nature of words of description rather than of limitation. As is now apparent to those skilled in the art, many modifications and variations of the subject invention are possible in light of the above teachings. It is, therefore, to be understood that within the scope of the appended claims, wherein reference numerals are merely for convenience and are not to be in any way limiting, the invention may be practiced otherwise than as specifically described.

What is claimed is:

1. A weatherstrip assembly for sealing between a frame and a closure member of a vehicle, said assembly comprising:
    a body extending along an axis to first and second opposing ends, said body having;
        a base;
        a first leg extending from said base;
        a second leg extending from said base with said first and second legs spaced from and extending substantially parallel to each other, and said base and said legs defining a channel for receiving the closure member;
        an exterior surface disposed outside of said channel;
        an interior base surface disposed within said channel along said base;
        a first interior leg surface disposed within said channel along said first leg; and
        a second interior leg surface disposed within said channel along said second leg;
    at least one sealing lip having an abutment surface with said sealing lip extending from at least one of said first and second legs for selectively engaging the closure member; and
    a wearstrip disposed along and extending from at least one of said interior base surface, said first interior leg surface, said second interior leg surface, and said abutment surface with said wearstrip formed of a thermoplastic polyethylene material for reducing friction as the closure member moves relative to said weatherstrip assembly;
    wherein said wearstrip has a plurality of alternating wear sections and gaps that define a series of alternating semi-rigid and flexible sections, respectively, along said axis, with each wear section having first and second surfaces and an engagement surface extending between said first and second surfaces, with each of said gaps being defined by said first surface of one of said wear sections and said second surface of an adjacent wear section facing each other and a portion of said body directly between said first and second surfaces; and
    wherein each of said first and second surfaces of said wear sections comprises a first end and a second end, with each of said first and second surfaces defining a plane, with each of said first and second surfaces of said wear sections extending along said at least one of said interior base surface, said first interior leg surface, said second interior leg surface, and said abutment surface between said respective pair of ends along said respective plane, and with each of said first and second surfaces of said wear sections disposed substantially perpendicular to said axis between said respective pair of ends.

2. A weatherstrip assembly as set forth in claim 1 wherein said wearstrip has a width transverse to said axis and each of said wear sections extend across said width of said wearstrip.

3. A weatherstrip assembly as set forth in claim 1 wherein said body and said at least one sealing lip have a first coefficient of friction and each of said wear sections have a second coefficient of friction with said second coefficient of friction less than said first coefficient of friction for facilitating movement of the closure member along said wearstrip.

4. A weatherstrip assembly as set forth in claim 1 wherein each of said wear sections has a length with each of said lengths being substantially the same relative to each other.

5. A weatherstrip assembly as set forth in claim 1 wherein each of said wear sections has a rectangular configuration.

6. A weatherstrip assembly as set forth in claim 1 wherein said thermoplastic polyethylene material of said wearstrip is further defined as an ultra-high-molecular-weight polyethylene material for reducing friction as the closure member moves along the wearstrip.

7. A weatherstrip assembly as set forth in claim 1 wherein each of said body and said at least one sealing lip are comprised of a rubber material for sealing against the closure member.

8. A weatherstrip assembly as set forth in claim 7 wherein said rubber material of each of said body and said at least one sealing lip is further defined as an ethylene propylene diene monomer rubber for sealing against the closure member.

9. A weatherstrip assembly as set forth in claim 1 wherein each of said engagement surfaces of said wear sections extends from said at least one of said interior base surface, said first interior leg surface, said second interior leg surface, and said abutment surface at least about 10 microns.

10. A weatherstrip assembly as set forth in claim 1 further including at least one tab extending from said body away from said channel for coupling said weatherstrip assembly to the frame.

11. A weatherstrip assembly as set forth in claim 1 wherein said at least one of said interior base surface, said first interior leg surface, said second interior leg surface, and said abutment surface define a depression with said wearstrip at least partially disposed within said depression to facilitate adhesion between said wearstrip and said at least one of said interior base surface, said first and second interior leg surfaces, and said abutment surface.

\* \* \* \* \*